July 28, 1959  D. B. ARDERN  2,897,138
CONTACTING SOLIDS AND GASES
Filed March 31, 1951
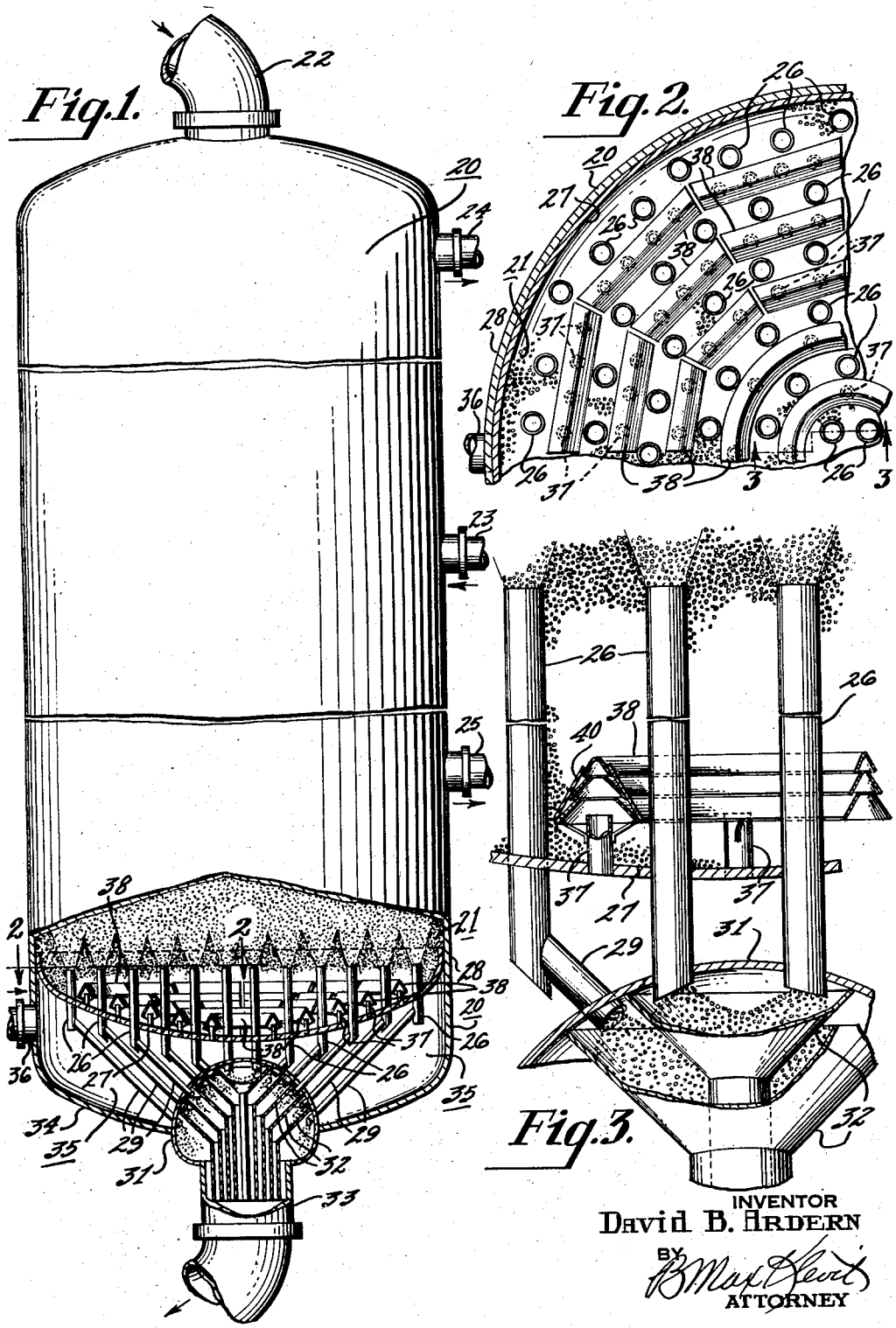
INVENTOR
David B. Ardern
BY
ATTORNEY

United States Patent Office 2,897,138
Patented July 28, 1959

2,897,138

CONTACTING SOLIDS AND GASES

David B. Ardern, Moylan, Pa., assignor to Houdry Process Corporation, Wilmington, Del., a corporation of Delaware Application March 31, 1951, Serial No. 218,660

9 Claims. (Cl. 208—165)

The present invention relates to contacting of solids and gases and is particularly concerned with improved operations and arrangements for passing gases and vapors through gravitating beds of solid contact materials. An important application of the invention is in connection with hydrocarbon conversion systems of the compact moving bed type.

The use of moving bodies or beds of solid particles or granules in processes that involve the contact of masses of such solid particles with fluids, as for example, catalytic conversions of organic vapors by solids catalysts, has resulted in considerable advantages due to the continuous nature of the process but has also been attended by operating difficulties occasioned by limitations inherent in the manner in which solid particles flow. Various disadvantages in presently used processes involving the engagement and subsequent counter-current flow of gas through a downwardly moving bed of fluent solid particles in a contact zone may be overcome using methods and apparatus embodying the present invention, as discussed more fully below.

The general technique for use of downwardly moving compact non-turbulent beds of fluent solid particles as contact masses is adequately set forth in the technical literature and hence does not need to be reviewed here. (See, for the application of this technique to the catalytic cracking of hydrocarbons, an article entitled "The 'T.C.C.' Cracking Process for Motor Gasoline Production," by R. H. Newton, G. S. Dunham, and T. P. Simpson, "Transactions of the American Institute of Chemical Engineers," volume 41, page 215, April 25, 1945, and the articles there cited; and for its application to the use of fluent inert particles for pyrolytic conversions, an article entitled "Thermofor Pyrolytic Cracking," by S. C. Eastwood and A. E. Potas, "Petroleum Processing," volume 3, page 837, September 1948.) Although the present invention is useful in connection with a wide variety of processes, it will, for convenience and brevity, be described in terms of hydrocarbon conversion processes, particularly cracking; those skilled in the art will be able to apply the process and apparatus set forth herein to other fields and uses.

As noted above, the flow of granular solids in bed form has inherent properties or characteristics that operate as limitations on the use of such solids as contact masses. One of these properties associated with the present invention, is that, when such solids flow or discharge through an opening at the bottom of a vessel containing a bed of such solids, there is flow or movement substantially only in an inverted frusto-conical zone extending into the bed above the opening, the bottom of the frusto-conical zone being coextensive with the opening and the outwardly tapering sides of the zone being inclined to the horizontal at the angle of flow (generally of the order of about 70°). The granular solids outside of this zone are static, or, at best, slowly moving and hence the downward movement of the bed, in regions where the frusto-conical zone does not extend to the sides, is not uniform. Consequently, uniformity of downward flow over the entire horizontal cross-sectional area of the bed is achieved by discharging the solids at a considerable plurality of locations or points regularly arranged over the horizontal cross-sectional area of the bottom of the bed. Under these conditions, there are many inverted frusto-conical zones of flow; these intersect each other a short distance above the points of discharge, and uniform flow accordingly results. Various devices for achieving uniform flow under such conditions, as well as a more detailed discussion of the problem, are set forth in U.S. Patent No. 2,412,135 to L. P. Evans, issued December 3, 1946. The use of granular solid withdrawal devices of the type referred to, or their equivalent, is therefore standard practice in withdrawing a stream of granular solids from a vessel containing a bed of considerably greater horizontal cross-sectional area than that of the stream withdrawn.

When it is desired to flow gas countercurrent to the downwardly moving bed of granular solids, it has been conventional practice to introduce such gas into the bed through one or more gas distributing devices of a type shaped to baffle the flow of granular solids and to form solids-free spaces or engaging surfaces for contacting the granular solids with gas. When the engaging surfaces are disposed uniformly over the horizontal cross-sectional area of the bed, the introduction and upward flow of the gas is effected uniformly. Characteristic of such gas distributing devices is a central beam communicating with spaced parallel inverted channels positioned normally to the beam and lying in a common horizontal plane (see U.S. patent to L. F. Strader, No. 2,480,887, issued Sepetember 6, 1949).

In certain known installations, such a gas distributing device is placed in the botom of the bed above the solids withdrawal device. Since required access to these two devices can be provided only by spacing them a minimum distance, such as 2 to 4 feet apart, there is necessarily a portion of the bed through which gas does not pass and hence, in a sense, constitutes a waste of useful volume. Another limitation encountered in practical operation is that the rate of flow of the gas, as it passes upwardly in the restricted area of the bed of solids surrounding the gas distributing device, should not exceed velocities that cause turbulence or lifting of the granular solids with consequent prevention or disruption of the downward flow of the solids.

The present invention provides methods and apparatus in which the operations of (a) withdrawing granular solids from a bed of solids in a contacting zone in such a manner that the bed flows uniformly downward and of (b) introducing gas to the bottom of the bed for upward flow therethrough are effected simultaneously and substantially within the same space. Under such conditions, the operation is more efficient and econimical and the vessel employed is simpler in its internal construction and shorter by as much as five feet when compared to vessels employing methods and arrangements previously used. Additionally, the present invention affords improvements in relation to certain thermal aspects in the regeneration of a coked hydrocarbon conversion catalyst (i.e., catalyst having a hydrocarbonaceous deposit accumulated during a previous period when the catalyst was used for hydrocarbon conversion, such as for cracking), chiefly as a result of heat exchange of the regenerating gas prior to initial contact with catalyst.

In accordance with the present invention, a plurality of confined streams of granular solids, such as hydrocarbon conversion catalyst, are withdrawn from a contacting zone wherein gas contacts granular solids moving downwardly in bed form, such as in a process zone in a hydrocarbon conversion system, at or near the bottom of this contacting zone at a plurality of points located over the horizontal cross-sectional area of said bottom so as to effect uniform downward flow of said solids. These confined streams are passed downwardly through a plurality of passageways extending through a confined plenum or gas-filled chamber. Gas, which is to contact the bed of solids in the contacting zone, is introduced into the plenum or gas-filled chamber, passed from the plenum into the bed of solid in the contacting zone at a plurality of locations substantially uniformly distributed over the horizontal cross-sectional area thereof and thereafter passed upwardly through the bed of solids in the contacting zone so as to flow uniformly through the bed (i.e., without channelling or unequal flow through any vertical portion of the bed). In the plenum the gas and solids are maintained out of contact so that the required height of the plenum need not take into consideration the provision of space sufficient to prevent lifting of solids by the gas or entrainment of fines therein. Moreover, since the plenum is arranged at the same vertical region in the system also housing at least part of the solids withdrawal device, the height of the vessel and/or the system is kept at a practical minimum.

The principles involved in the present invention are set forth in detail below in connection with the description of the drawing in which:

Figure 1 is a vertical view of a vessel containing solid particles in bed form, which particles are contacted by gas, with portions of the vessel broken away for a better view of the relationship of the internal structure or elements, and illustrates a preferred embodiment of the invention;

Figure 2 is a portion of an enlarged transverse section of the vessel illustrated in Figure 1 taken along the lines 2—2 showing the relationship of the internal structure of the vessel at this level; and Figure 3 is an enlarged vertical view of several of the elements shown in Figure 1.

Shown in Figure 1 is a regeneration vessel or kiln indicated generally at 20 which vessel comprises a plurality of contacting or regeneration chambers, stages or zones, containing downwardly moving solid particles of hydrocarbon conversion catalyst in bed form, the lowermost of which zones is indicated generally at 21. Fluent solid particles in the size range of from about 50 mesh to about 0.5 inch and comprising coked solid hydrocarbon conversion catalyst, such as granules of acid-activated montmorillonite clay, synthetic silica-alumina gel in pellet or bead form or particles of other solid refractory inorganic compositions known by those skilled in the art to be hydrocarbon cracking catalyst, are introduced to vessel 20 by conduit 22. The particles of coked hydrocarbon conversion catalyst introduced by conduit 22 gravitated downwardly through housing 20 in bed form (i.e., in compact non-turbulent flow) and are contacted under combustion conditions by oxygen-containing gas introduced through conduit 23 to the bed by gas introduction devices known to the art (not shown), the resulting flue gas being disengaged from the particles and removed by conduit 24.

The conditions of contact and/or the amount of the oxygen-containing gas in the upper regeneration zone (or zones, if several are employed) are controlled, as by the use of cooling coils (not shown) and/or by valves (not shown) in conduits 23 and/or 24, so that only a portion of the coke deposit is removed. Additional removal of coke is effected by introducing oxygen-containing gas at the bottom of the vessel in a manner described more fully below, passing this gas through bed 21 in the lowermost regeneration zone under combustion conditions, and removing the resulting flue gas, after disengagement from the particles by disengaging devices known to the art, through conduit 25.

In the illustrated embodiment of the invention, the particles of regenerated catalyst, which may contain a small residual coke deposit, are removed from the lowermost regeneration zone through a plurality of vertical conduits 26, which conduits are spaced substantially uniformly over the horizontal cross-sectional area of bed 21, as shown in Figure 2, so as to insure uniform downward flow of bed 21. Conduits 26 are affixed to and extend a small distance, such as from about 2 to 30 inches, depending on diameter of the vessel and amount of curvature of the partition, vertically above and vertically below a laterally disposed tube sheet or partition 27, which is preferably arcuate in design as shown in Figures 1 and 3, and is positioned so that it is upwardly concave. (The arcuate partition can conveniently be in the form or shapes of a generally dish-shaped "welding head" used for the end of a cylindrical vessel.) Partition 27 can be affixed permanently to wall 28 of vessel 20 or it can be rigidly but removably attached, as by bolts, to wall 28 or it can be supported by a flange affixed to wall 28. In any event its shape and relationship with wall 28 is such that it is adapted to support above it a bed of the granular solids passing through the vessel, and provides a gas-tight chamber below the partition.

After traversing the confined passageways defined by vertical conduits 26 as confined, compact streams or columns, the granular solids flow downwardly and centrally through sloping and converging conduits 29 to a common location. The sloping conduits 29, which are individually affixed, as by welding, to and communicate with the bottoms of conduits 26, are placed at an angle such that the granular solids flow freely therein (i.e, the angles between the axes of the conduits and the horizontal are all greater than the angle of static repose of the granular solids, such as an angle of 45° or greater). Conduits 29 pass through a rounded or generally hemispherical baffle or head 31 and terminate shortly thereafter. Positioned within baffle 31, as by welding to the interior surface thereof, are a plurality of nested spaced funnels 32, which funnels terminate in a common horizontal plane within conduit 33. These funnels are designed and arranged so that uniform flow of granular solids in conduits 26 and 29 is effected in the manner described in the patent to Evans referred to above. The particles of freshly regenerated catalyst in conduit 33 pass downwardly therein as a compact column to a pneumatic lift or mechanical elevator and are thereafter conveyed to the top of a hydrocarbon conversion zone, or vessel, or pass directly to a hydrocarbon conversion zone located below vessel 20.

As shown in the illustrated embodiment (Figure 1), the laterally disposed partition 27, which supports the bed of granular solids in the lowermost regeneration zone 21, is spaced above and apart from the bottom or end 34 of vessel 20, which bottom, as shown, may be in the shape of a welding head. The space or chamber between partition 27 and bottom closure 34 (and exclusive of conduits 26 and 29) constitutes a plenum, or gas-filled space or chamber 35, into which gas is introduced, as through conduit 36. Gas from plenum 35 passes upwardly through short open-ended vertical conduits or nipples 37 which are affixed to partition 27 and extend vertically upward therefrom a short distance, such as from about 2 to 6 inches. After passage through conduits 37, the gas passes into the gas spaces below louvered channels or inverted troughs 38 from which space the gas emerges and engages the bed of granular solids resting on partition 27. As stated above, the gas then passes uniformly upwardly through bed 21 and is removed from vessel 20 through conduit 25. The conduits 37 extend upwardly into louvered channels 38 and are spaced from the top thereof by rods or supports, the louvers being maintained in fixed relationship by rods or supports 40. Instead of louvered channels 38 other gas-engaging devices known to the art and performing the same function may be used. By extending the nipples 37, the channels 38 or equivalent gas-engaging devices may be placed at a common horizontal level to equalize pressure drop, instead of following the contour of partition 27, as shown in Figure 1.

As can be seen from the above description, withdrawal of the granular solids from the regeneration zone is effected under conditions which promote uniform downward flow of the bed of particles in the regeneration zone, while engagement of the oxygen-containing gas therewith is also effected in substantially the same portion or space of the regeneration vessel or zone. Consequently, the height of a regeneration vessel employing such a method is substantially less, such as from 2 to 5 or more feet, than regeneration vessels constructed and operated according to the prior art where engaging devices for the introduction of the oxygen-containing gas are located above and spaced a distance apart from the location at which the particles of catalyst were withdrawn. Moreover, by locating the gas engaging devices in a portion of the bed containing non-moving solids, as in the illustrated preferred embodiment, possible churning or turbulence of solids by the gas and/or accumulation of fines therein do not create any problem.

In accordance with one aspect of the invention, additional advantages in the cost of the construction of the regeneration vessel are gained by admitting oxygen-containing gas, such as air, to plenum 35 at a considerably lower temperature, such as from about 50° to 800° F. lower than the temperature of the regenerated catalyst, so that such gas cools conduits 29 and that portion of conduits 26 within plenum 35. Such cooling permits operation of the lowermost regeneration zone at relatively high temperatures, if desired, such as from 1050° to 1200° F., without necessitating the use of expensive high-temperature resistant alloys for construction of the conduits within the plenum.

A further advantage gained by the above-described method and apparatus results from the fact that the oxygen-containing gas engages the bed of granular fluent solids in a static portion of the bed (i.e., where there is relatively little or no flow of granular solids). Because the gas enters a static portion of the bed, gas velocities high enough to stop or slow down the downward flow of granular solids or even lift the particles can be employed without interfering with the flow of solid in the regeneration zone proper (i.e., above the tops of conduits 26). These velocities should however be below velocities interfering with the flow of granular solids above the top of conduits 26. Moreover, because of the distance between the tops of conduits 26 and louvered channels 38 the gas has an opportunity to distribute itself uniformly over the bed. The present method of operation thus provides significant advantages over previously used methods of gas engagement wherein the solids flowed past the gas introduction devices and hence were limited to gas velocities that would not even locally interfere with the downward flow of granular solids.

The chamber 35 being maintained free of moving solids and having no exposed surface of a solids bed therein, there are no limitations imposed on gas admission into the chamber. The height of the chamber is governed only by the necessary projected height of the conduits 29 therein, dictated by requisites for obtaining uniform flow of solids from the bed 21, and the unoccupied space thus provided outside of the conduits 26 and 29 will be ample for service as a gas-charging plenum.

By mounting the gas inlet conduits 37 directly in the partition 27 simplification of design and important structural economies are effected over prior more complex arrangements wherein the gas-engaging devices are associated with a gas manifolding beam and its supporting structure.

Although the present invention was described in connection with the introduction of oxygen-containing gas at the bottom of the lowermost regeneration zone, it can be utilized in other ways, as for example, for introducing gas into other zones of a kiln, or to introduce hydrocarbon vapors or purging gas, such as steam, to the bottom of a hydrocarbon conversion zone, or to introduce stripping steam or other gas at the bottom of an adsorption zone (e.g., in the "hypersorption" type of process). Particular apparatus other than that shown in the drawing can be employed to effect the method of operation described herein. Other adaptations of the invention within the scope of the appended claims will be apparent to those skilled in the art.

Obviously many modifications and variations of the invention as hereinbefore set forth may be made without departing from the spirit and scope thereof and therefore only such limitations should be imposed as are indicated in the appended claims.

I claim as my invention:

1. In a vessel for contacting granular solids with gas, wherein said solids gravitate as a compact moving bed through a contact chamber in countercurrent-flow relation to said gas, the combination of a transverse tube-sheet extending across the lower region of said vessel and separating the same into an upper contact chamber adapted to contain said bed and a lower solids-free gas-distributing chamber, a plurality of solids-withdrawal conduits uniformly distributed throughout said tube-sheet and extending from a level well within the lower region of said bed downwardly through said gas-distributing chamber, a single solids-discharge conduit at the lower end of said vessel adapted to receive the solids from all said withdrawal conduits, gas inlet means in said gas-distributing chamber, and means for uniformly distributing said gas from said distributing chamber throughout the bottom region of said bed at a level spaced a substantial distance below said level of solids withdrawal, the level of gas introduction being such that said gas is made to flow upwardly through a relatively-deep static layer of solids before engaging the lowermost moving portions of said bed, whereby gas introduced into said bed at relatively high velocity is so distributed and dispersed throughout said static layer that upon reaching said level of solids withdrawal its velocity is insufficient to adversely affect the smooth flow of solids into said withdrawal conduits.

2. Apparatus as in claim 1 in which said means for uniformly distributing gas from said distributing chamber into the bottom region of said bed comprises a plurality of short gas-conducting conduits having their lower ends set in said tube-sheet between said solids-withdrawal conduits, and solids-deflecting means covering the upper ends of said short conduits to form solids-free spaces within said static layer having open communication with internal exposed surfaces of said static layer.

3. Apparatus as in claim 2 in which said solids-withdrawal conduits and said short gas-conducting conduits are arranged on alternate concentric circles, and in which said solids-deflecting means comprises inverted channel members each common to an individual group of short conduits in an individual circle of conduits.

4. Apparatus as in claim 3 in which said channels are lowered so as to provide multiple levels of exposed gas-engaging surfaces of solids within said static layer.

5. In a process wherein gas flows upwardly through a compact bed of granular contact material contained within a confined contact zone, the steps which comprise: withdrawing a plurality of confined compact moving streams of solids from said bed at locations uniformly distributed across the lower region of said bed a substantial distance above the lower end of said contact zone, thereby separating said compact bed into a uniformly gravitating upper portion and a static lower layer, passing said confined streams of solids downwardly through a solids-free plenum directly beneath said contact zone and thereafter merging the same into a single compact moving stream, introducing said gas into said plenum, passing said gas upwardly as a plurality of confined streams from said plenum into the bottom region of said static layer to engage said solids at locations uniformly distributed across the bottom cross-sectional area of said contact zone, passing said gas first upwardly through said static layer to effect complete lateral dispersion of said gas therein with consequent reduction in velocity and then upwardly through said gravitating upper portion of the bed, and withdrawing said gas at the upper end of said contact zone.

6. A method as in claim 5 characterized in that said plurality of compact moving stream of solids are withdrawn at a common horizontal level spaced a substantial distance above the lower end of said contact zone.

7. A method as in claim 5 characterized in that said confined compact moving streams of withdrawn solids are passed first vertically downward and then downwardly and convergently inward toward the extended vertical axis of said contact zone, said streams being progressively combined and reduced in number before discharging as a single stream.

8. A method as in claim 5 wherein said gas is oxygen-containing gas, said solids comprise coked particles of catalyst introduced into said contact zone at elevated temperature substantially higher than the temperature of said gas and sufficient to effect the combustion of said coke in the presence of said gas, whereby said gas is preheated within said plenum by indirect heat exchange with the hot regenerated catalyst in said confined streams passing through said plenum.

9. A method as in claim 8 characterized in that said contact zone comprises the regeneration zone of a hydrocarbon conversion process including a conversion zone wherein coke is deposited as a conversion product upon said catalyst.

References Cited in the file of this patent

UNITED STATES PATENTS

| | | |
|---|---|---|
| 2,412,135 | Evans | Dec. 3, 1946 |
| 2,463,623 | Huff | Mar. 8, 1949 |
| 2,487,961 | Angell | Nov. 15, 1949 |
| 2,542,887 | Watson | Feb. 20, 1951 |
| 2,558,769 | McKinney | July 3, 1951 |
| 2,560,343 | Hemminger | July 10, 1951 |
| 2,561,331 | Barker | July 24, 1951 |
| 2,656,007 | Arnold et al. | Oct. 20, 1953 |
| 2,690,955 | Daniel | Oct. 5, 1954 |